US 6,703,450 B2

(12) United States Patent
Bauerle et al.

(10) Patent No.: US 6,703,450 B2
(45) Date of Patent: Mar. 9, 2004

(54) CURABLE BASE-RESISTANT FLUOROELASTOMERS

(75) Inventors: John Gordon Bauerle, Wilmington, DE (US); Walter Werner Schmiegel, Wilmington, DE (US)

(73) Assignee: DuPont Dow Elastomer, L.L.C., Wilmington, DE (US)

( * ) Notice: Subject to any disclaimer, the term of this patent is extended or adjusted under 35 U.S.C. 154(b) by 77 days.

(21) Appl. No.: 10/137,914

(22) Filed: May 2, 2002

(65) Prior Publication Data

US 2003/0065132 A1 Apr. 3, 2003

Related U.S. Application Data

(60) Provisional application No. 60/290,900, filed on May 15, 2001.

(51) Int. Cl.[7] .................. C08F 214/26; C08G 73/24; C08K 5/00
(52) U.S. Cl. ................ 525/326.3; 525/326.4; 525/359.3; 525/340; 525/343; 525/345; 525/366; 525/374; 525/386; 525/281
(58) Field of Search .................. 525/326.3, 326.4, 525/359.3, 340, 343, 345, 366, 374, 386, 281

(56) References Cited

U.S. PATENT DOCUMENTS

| 4,529,784 A | 7/1985 | Finlay |
| 4,882,390 A | 11/1989 | Kolb |
| 4,910,260 A | 3/1990 | Wachi et al. |
| 4,912,171 A | 3/1990 | Grootaert et al. |
| 6,329,469 B1 | 12/2001 | Bowers et al. |

FOREIGN PATENT DOCUMENTS

| JP | 5224956 | 7/1977 |

*Primary Examiner*—D. R. Wilson

(57) ABSTRACT

Compositions of specialty fluoroelastomers containing copolymerized units of tetrafluoroethylene, propylene, optionally vinylidene fluoride, and a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene are readily curable with polyhydroxy curing systems. The resulting cured articles have a combination of excellent resistance to alkaline fluids, superior tensile properties and compression set resistance.

15 Claims, No Drawings

CURABLE BASE-RESISTANT FLUOROELASTOMERS

CROSS-REFERENCE TO RELATED APPLICATIONS

This application claims the benefit of U.S. Provisional Application No. 60/290,900 filed May 15, 2001.

FIELD OF THE INVENTION

This invention relates to polyhydroxy curable fluoroelastomer compositions wherein the fluoroelastomer comprises copolymerized units of tetrafluoroethylene, propylene, and a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene.

BACKGROUND OF THE INVENTION

Specialty fluoroelastomers made from copolymers of tetrafluoroethylene (TFE), propylene (P), and optionally vinylidene fluoride ($VF_2$) (i.e. TFE/P dipolymers or $VF_2$/TFE/P terpolymers) are often utilized in applications wherein resistance to alkaline fluids and other high pH chemicals is critical. The TFE/P dipolymers have the best resistance to alkaline fluids. Terpolymers containing more than about 10 wt. % vinylidene fluoride units generally do not have significantly better alkaline fluid resistance than do conventional fluoroelastomers made from copolymers of vinylidene fluoride, hexafluoropropylene and tetrafluoroethylene.

In order to fully develop physical properties such as tensile strength, elongation, and compression set, elastomers must be cured, i.e. crosslinked. In the case of fluoroelastomers, this is generally accomplished by mixing uncured polymer (i.e. fluoroelastomer gum) with a polyfunctional curing agent and heating the resultant mixture under pressure, thereby promoting chemical reaction of the curing agent with active sites along the polymer backbone or side chains. Interchain linkages produced as a result of these chemical reactions cause formation of a crosslinked polymer composition having a three-dimensional network structure. Commonly used curing agents for fluoroelastomers include difunctional nucleophilic reactants, such as polyhydroxy compounds. Alternatively, peroxidic curing systems containing organic peroxides and unsaturated coagents, such as polyfunctional isocyanurates, may be employed.

In many cases, polyhydroxy and peroxide cure processes or curing agent formulations are unsatisfactory when used to crosslink these specialty fluoroelastomers. For example, it is known to cure elastomeric $VF_2$/TFE/P terpolymers with either peroxide (U.S. Pat. No. 4,910,260) or polyhydroxy (U.S. Pat. Nos. 4,882,390 and 4,912,171) cure systems. However, when such compositions are cured using a polyhydroxy compound, the cured products may exhibit undesirably high compression set. In fact, such specialty fluoroelastomers which contain less than about 10 wt. % copolymerized units of vinylidene fluoride show little to no cure response with polyhydroxy cure formulations.

The peroxide cures disclosed in U.S. Pat. No. 4,910,260 are undesirable because the curable compositions which are initially formed are extremely scorchy and would therefore be unsuitable for many commercial processes.

It would be particularly desirable to have an improved specialty fluoroelastomer that is resistant to alkaline fluids and which readily crosslinks with polyhydroxy cure systems to form cured articles having good tensile properties and compression set resistance.

SUMMARY OF THE INVENTION

It has been surprisingly found that the incorporation of a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene into TFE/P dipolymers or into $VF_2$/TFE/P terpolymers improves the polyhydroxy curing of these specialty fluoroelastomers without significantly diminishing the resistance of these fluoroelastomers to alkaline fluids. The resulting cured fluoroelastomer articles have excellent compression set resistance and tensile properties.

Accordingly, an aspect of this invention is a curable fluoroelastomer composition comprising A) a specialty fluoroelastomer comprising copolymerized units of 45 to 80 weight percent tetrafluoroethylene; 10 to 40 weight percent propylene; and 0.1 to 15 weight percent of a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene;

B) 0.1 to 20 parts by weight per 100 parts fluoroelastomer of a polyhydroxy curing agent;

C) 1 to 30 parts by weight per 100 parts fluoroelastomer of an acid acceptor; and D) 0.1 to 20 parts by weight per 100 parts fluoroelastomer of a vulcanization accelerator.

The polyhydroxy curing agent and vulcanization accelerator may be present as separate components or as the salt of the curing agent and accelerator.

Another aspect of the present invention is a specialty fluoroelastomer comprising copolymerized units of 45 to 80 weight percent tetrafluoroethylene; 10 to 40 weight percent propylene; and 0.1 to 15 weight percent of 3,3,3-trifluoropropene-1 cure site monomer.

DETAILED DESCRIPTION OF THE INVENTION

Specialty fluoroelastomers which may be employed in the curable compositions of this invention include the terpolymer of tetrafluoroethylene (TFE), propylene (P) and a cure site monomer selected from the group consisting of i) trifluoroethylene (TrFE), ii) 3,3,3-trifluoropropene-1 (TFP), iii) 1,2,3,3,3-pentafluoropropylene (1-HPFP) iv) 1,1,3,3,3-pentafluoropropylene (2-HPFP), and v) 2,3,3,3-tetrafluoropropene. Minor amounts (i.e. less than about 20 weight percent total) of other copolymerizable monomers may be present in higher order copolymer fluoroelastomers of this invention. Examples of such monomers include, but are not limited to chlorotrifluoroethylene, vinyl fluoride, perfluoro(alkyl vinyl) ethers, perfluoro(alkoxy vinyl) ethers, perfluoro(alkoxyalkyl vinyl) ethers, perfluoroalkyl- or perfluoroalkoxy-alkenyl ethers (such as those disclosed in U.S. Pat. No. 5,891,965), ethylene, isobutene, and bromine- or iodine-containing cure site monomers such as $CF_2=CFOCF_2CF_2CF_2OCF_2CF_2Br$; 1-bromo-2,2-difluoroethylene; bromo-trifluoroethylene; 4-bromo-3,3,4,4-tetrafluorobutene-1; 4-bromo-1,1,2-trifluorobutene-1; 2-bromoperfluoro(ethyl vinyl) ether; 3-bromoperfluoro (propyl vinyl) ether; and 4-iodo-3,3,4,4-tetrafluorobutene-1. Alternatively, bromine or iodine cure sites may be introduced onto the fluoroelastomer polymer chain ends by use of iodinated or brominated chain transfer agents such as methylene iodide or 1, 4-diiodoperfluoro-butane during polymerization. The presence of brominated or iodinated groups permits the fluoroelastomers of this invention to be cured by organic peroxides in addition to polyhydroxy curatives.

Generally the specialty fluoroelastomers used in the compositions of this invention contain between 45 to 80 (preferably between 50 to 78, most preferably 65 to 78) weight percent copolymerized units of tetrafluoroethylene, based on the total weight of the fluoroelastomer. Less TFE causes the polymerization to be slow, while more TFE causes the resulting polymer to be plastic, rather than elastomeric.

The fluoroelastomers employed in the compositions of this invention typically contain between 10 to 40 (preferably between 12 to 30, most preferably 15 to 25) weight percent copolymerized units of propylene, based on the total weight of the fluoroelastomer. Less propylene causes the polymer to become plastic, while more propylene causes the polymerization to become slow.

The specialty fluoroelastomers used in the compositions of this invention also contain 0.1 to 15 (preferably 2 to 10, most preferably 3–6) weight percent copolymerized units of a cure site monomer, based on the total weight of the fluoroelastomer. The cure site monomer is selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene. The monomer 3,3,3-trifluoropropene-1 is especially preferred.

It is believed that during the polyhydroxy curing process, some copolymerized units of cure site monomer, which are located adjacent to tetrafluoroethylene units in the fluoroelastomer polymer chain, dehydrofluorinate to form sites of unsaturation (i.e. C—C double bonds). These unsaturated sites are then available to react with polyhydroxy curatives to form crosslinks. Fluoroelastomers containing less than 0.1 wt. % units of cure site units do not form a sufficient number of crosslinks to yield a cured product having desirable tensile properties for most end uses. Fluoroelastomers containing more than 15 wt. % cure site units are not desirable because the polymerization is slowed and there is a reduction in the fluoroelastomer's resistance to alkaline fluids and other high pH chemicals.

A particularly preferred fluoroelastomer comprises copolymerized units of tetrafluoroethylene, propylene and 3,3,3-trifluoropropene-1 in the amounts specified above.

Preferably, the fluoroelastomers employed in this invention do not contain any copolymerized units of vinylidene fluoride. However, the fluoroelastomers may, optionally, contain up to 20 weight percent copolymerized units of vinylidene fluoride ($VF_2$), based on the total weight of the fluoroelastomer. If the fluoroelastomer does contain units of vinylidene fluoride, the level is preferably 2 to 20 (most preferably between 10 and 20) weight percent. Generally, the lower the level of vinylidene fluoride, the better the fluoroelastomer's resistance to alkaline fluids (also referred to as "base resistance" in the art). However, copolymers of TFE and P containing no vinylidene fluoride units generally have poor resistance to hydrocarbon fluids such as oils or fuels. The addition of $VF_2$ to the fluoroelastomer increases the fluorine atom content and thus improves the resistance to hydrocarbons, but at the same time reduces the resistance of the fluoroelastomer to polar fluids. Depending upon the end use application environment, fluoroelastomer base resistance and hydrocarbon fluid resistance can be balanced by adjusting the level of copolymerized vinylidene fluoride and tetrafluoroethylene in the fluoroelastomer.

The fluoroelastomers of this invention are generally prepared by free radical emulsion or suspension polymerization. Preferably, the polymerizations are carried out in batch, or semi-batch emulsion processes well known in the art. The resulting fluoroelastomer latexes are usually coagulated by addition of electrolytes. The precipitated polymer is washed with water and then dried, for example in an air oven, to produce a substantially dry fluoroelastomer gum.

In the semi-batch emulsion polymerization process of this invention, a gaseous monomer mixture of a desired composition (initial monomer charge) is introduced into a reactor which contains an aqueous solution. The aqueous solution contains a surfactant such as ammonium perfluorooctanoate or perfluorohexylethyl sulfonic acid. Generally, the pH of the solution is controlled to between 1 and 7 (preferably 3–7), depending upon the type of fluoroelastomer being made. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of a TFE, P and cure site monomer and, optionally, one or more additional monomers such as $VF_2$. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring.

The temperature of the semi-batch reaction mixture is maintained in the range of 25° C.–130° C., preferably 50° C.–100° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature.

Polymerization times in the range of from 2 to 60 hours are typically employed in this semi-batch polymerization process.

Curable compositions of this invention contain 1) a specialty fluoroelastomer, as defined above, (preferably the fluoroelastomer of this invention), 2) a polyhydroxy curative, 3) an acid acceptor and 4) a vulcanization (or curing) accelerator. In the case of fluoroelastomers which contain bromine or iodine atom cure sites, the curable compositions of this invention may, optionally, also contain an organic peroxide and a multifunctional curing coagent. Cured articles resulting from the latter compositions contain crosslinks due to both the polyhydroxy and peroxide curing systems and are sometimes referred to in the art as dual cured elastomers.

The curable compositions of the invention contain between 0.1 to 20 parts by weight (preferably 1–3 parts) of polyhydroxy crosslinking agent (or a derivative thereof) per 100 parts fluoroelastomer. Typical polyhydroxy crosslinking agents include di-, tri-, and tetrahydroxybenzenes, naphthalenes, and anthracenes, and bisphenols of the formula

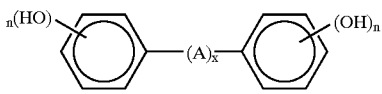

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxybenzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

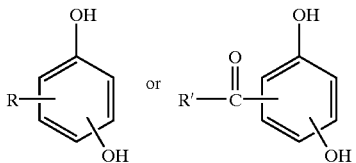

where R is H or an alkyl group having 1–4 carbon atoms or an aryl group containing 6–10 carbon atoms and R' is an alkyl group containing 1–4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$–$R_4$ are $C_1$–$C_8$ alkyl groups and at least three of $R_1$–$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

The curable compositions of the invention also contain between 1 to 30 parts by weight (preferably 1 to 7 parts) of an acid acceptor per 100 parts fluoroelastomer. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, zinc oxide and calcium oxide. Calcium hydroxide and magnesium oxide are preferred.

Vulcanization accelerators which may be used in the curable compositions of the invention include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$–$C_{20}$ alkyl, aryl, aralkyl, alkenyl, and the chlorine, fluorine, bromine, cyano, —OR, and —COOR substituted analogs thereof, with R being $C_1$–$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$–$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino)phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.1 and 20 parts by weight per hundred parts by weight fluoroelastomer. Preferably, 0.5–3.0 parts accelerator per hundred parts fluoroelastomer is used.

Optionally, the curable compositions of the invention may contain a second curing agent in the form of a combination of an organic peroxide and a multifunctional (i.e. polyunsaturated) coagent compound. Examples of organic peroxides which are particularly effective curing agents for fluoroelastomers include dialkyl peroxides or bis(dialkyl peroxides) which decompose at a temperature above 50° C. In many cases one will prefer to use a di-t-butylperoxide having a tertiary carbon atom attached to a peroxy oxygen. Among the most useful are 2,5-dimethyl-2,5-di(t-butylperoxy)hexyne-3 and 2,5-dimethyl-2,5-di(t-butyl-peroxy)hexane. Other peroxides can be selected from such compounds as dicumyl peroxide, dibenzoyl peroxide, t-butyl perbenzoate, and di[1,3-dimethyl-3-(t-butyl-peroxy)butyl]carbonate. Multifunctional coagents which cooperate with such peroxides to provide curing systems include methacrylates, allyl compounds, divinyl compounds, and polybutadienes. Specific examples of coagents include one or more of the following compounds: triallyl cyanurate; triallyl isocyanurate; tris(diallylamine-s-triazine); triallyl phosphite; hexaallyl phosphoramide, N,N-diallyl acrylamide; N,N,N'N'-tetraallyl terephthalamide; N,N,N',N'-tetraallyl malonamide; trivinyl isocyanurate; 2,4,6-trivinylmethyltrisiloxane; and tri(5-norbornene-2-methylene)cyanurate. If a peroxide cure system is present in the compounds of the invention, the organic peroxide is generally at a level between 0.2 to 7 parts by weight (preferably 1 to 3 parts) per 100 parts fluoroelastomer and the coagent is present at a level of 0.1 to 10 (preferably 2 to 5) parts by weight per 100 parts fluoroelastomer.

The curable composition of the invention may contain other additives, commonly used in elastomer compounding and processing. The latter may be introduced into the composition before addition of the curative, simultaneously with it, or following the addition. Typical additives include fillers, plasticizers, processing aids, antioxidants, pigments, and the like. The amount of such ingredients which is added will depend on the particular end use applications for which the cured compositions are adapted. Fillers, such as carbon black, clays, barium sulfate, calcium carbonate, magnesium silicate, and fluoropolymers are generally added in amounts of from 5–100 parts by weight per 100 parts fluoroelastomer. The amount of plasticizer used is generally from 0.5–5.0 parts by weight per 100 parts fluoroelastomer. Typical plasticizers include esters, such as dioctyl phthalate and dibutyl sebacate. Processing aids are generally used in amounts of from 0.1–2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The fluoroelastomer, polyhydroxy curative, acid acceptor, accelerator and any other ingredients are generally incorporated into the curable compositions of the invention by means of an internal mixer or rubber mill. The resulting composition may then be shaped (e.g. molded or extruded) and cured. Curing typically takes place at about 150°–200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded article is heated in an oven or the like for an additional period of about 1–48 hours, typically from about 180°–275° C., generally in an air atmosphere.

The polymers of the invention and curable compositions of the invention result in cured fluoroelastomer articles which have unusually good base resistance, tensile properties and compression set resistance. Such articles find application as gaskets, seals and tubing, particularly in automotive end uses.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Mooney Scorch | ASTM D1646 |
| Oscillating Disc Rheometer (ODR) | ASTM D2084 |
| Moving Disc Rheometer (MDR) | ASTM D5289 |
| Tensile Strength ($T_B$) | ASTM D412 |
| Modulus ($M_{100}$) | ASTM D412 |
| Elongation at Break ($E_B$) | ASTM D412 |
| Hardness | ASTM D2240 |
| Compression Set-B | ASTM D395 |

Example 1

A polymer of the invention (Polymer 1) was prepared by a semi-batch emulsion polymerization, carried out at 60° C. in a well-stirred reaction vessel. A 33-liter, horizontally agitated reactor was charged with 20 liters of deionized, deoxygenated water, 150 g of ammonium perfluorooctanoate and 70 g of sodium phosphate dibasic heptahydrate. The reactor was heated to 60° C. and then pressurized to 1.93 MPa with a mixture of 80.0 wt. % tetrafluoroethylene (TFE), 10.0 wt. % propylene (P), and 10.0 wt. % 3,3,3-trifluoropropene-1 (TFP). A 250 ml aliquot of an aqueous 10 wt. % ammonium persulfate initiator solution was then added. A mixture of 70.0 wt. % TFE, 20.0 wt. % P, and 10.0 wt. % TFP was supplied to the reactor to maintain a pressure of 1.93 MPa throughout the polymerization. The initiator solution was fed continuously at 5 ml/hour through the end of the reaction period. After a total of 6000 g of monomer mixture had been supplied to the reactor, monomer addition was discontinued and the reactor was purged of residual monomer. The total reaction time was 60 hours. The resulting fluoroelastomer latex was coagulated by addition of aluminum potassium sulfate solution, filtered and then washed with deionized water. The polymer crumb was dried for two days at 60° C. The product, composed of 70 wt. % TFE units, 20 wt. % P units, and 10 wt. % TFP units, was an amorphous elastomer having a glass transition temperature of 8° C., as determined by differential scanning calorimetry (heating mode, 10° C./minute, inflection point of transition). Mooney viscosity, ML-10 (121° C.), was 19.

Example 2

A polymer of the invention (Polymer 2) was prepared by a semi-batch emulsion polymerization, carried out at 60° C. in a well-stirred reaction vessel. A 33-liter, horizontally agitated reactor was charged with 20 liters of deionized, deoxygenated water, 300 g of ammonium perfluorooctanoate and 70 g of sodium phosphate dibasic heptahydrate. The reactor was heated to 60° C. and then pressurized to 2.07 MPa with a mixture of 90.0 wt. % TFE, 5.0 wt. % P, and 5.0 wt. % TFP. A 250 ml aliquot of an aqueous 10 wt. % ammonium persulfate initiator solution was then added. A mixture of 73.0 wt. % TFE, 23.0 wt. % P, and 4.0 wt. % TFP was supplied to the reactor to maintain a pressure of 2.07 MPa throughout the polymerization. The initiator solution was fed continuously at 5 ml/hour through the end of the reaction period. After a total of 8000 g monomer mixture had been supplied to the reactor, monomer addition was discontinued and the reactor was purged of residual monomer. The total reaction time was 36 hours. A portion of the resulting fluoroelastomer latex was retained for use as a seed polymer latex in Example 4. The remaining latex was coagulated by addition of aluminum potassium sulfate solution and then washed with deionized water. The polymer crumb was dried for two days at 60° C. The product, containing 73 wt. % TFE units, 23 wt. % P units, and 4 wt. % TFP units, was an amorphous fluoroelastomer having a glass transition temperature of 0.3° C., as determined by differential scanning calorimetry (heating mode, 10° C./minute, inflection point of transition). Mooney viscosity, ML-10 (121° C.), was 17.

Example 3

A polymer of the invention (Polymer 3) was prepared by a semi-batch emulsion polymerization, carried out at 60° C. in a well-stirred reaction vessel. A 33-liter, horizontally agitated reactor was charged with 20 liters of deionized, deoxygenated water, 200 g of perfluorohexylethyl sulfonic acid and 20 g of sodium hydroxide. The reactor was heated to 60° C. and then pressurized to 2.07 MPa with a mixture of 95.0 wt. % TFE and 5.0 wt. % P. A 326 ml aliquot of an aqueous initiator solution containing 10 wt. % ammonium persulfate and 2.5 wt. % sodium hydroxide was then added. A mixture of 70.0 wt. % TFE, 20.0 wt. % P, 5.0 wt. % vinylidene fluoride ($VF_2$), and 5.0 wt. % TFP was supplied to the reactor to maintain a pressure of 2.07 MPa throughout the polymerization. The initiator solution was fed continuously at 6 ml/hour through the end of the reaction period. After a total of 8000 g monomer mixture had been supplied to the reactor, monomer addition was discontinued and the reactor was purged of residual monomer. The total reaction time was 25 hours. The resulting fluoroelastomer latex was coagulated by addition of aluminum potassium sulfate solution and then washed with deionized water. The polymer crumb was dried for two days at 60° C. The product, containing 70 wt. % TFE units, 20 wt. % P units, 5 wt. % $VF_2$, and 5 wt. % TFP units, had a Mooney viscosity, ML-10 (121° C.), of 21.

Example 4

A polymer of the invention (Polymer 4) was prepared by a semi-batch emulsion polymerization process, carried out at 60° C. in a well-stirred reaction vessel. A 33-liter, horizontally agitated reactor was charged with 17.4 liters of deionized, deoxygenated water, 259 g of ammonium perfluorooctanoate, 70 g of sodium phosphate dibasic heptahydrate and 4000 g of seed polymer latex from Example 2. The reactor was heated to 60° C. and then pressurized to 2.07 MPa with a mixture of 95.0 wt. % TFE and 5.0 wt. % P. A 225 ml aliquot of an aqueous 10 wt. % ammonium persulfate initiator solution was then added. A mixture of 73.0 wt. % TFE, 23.0 wt. % P, and 4.0 wt. % TFP was supplied to the reactor to maintain a pressure of 2.07 MPa throughout the polymerization. The initiator solution was fed continuously at 5 ml/hour through the end of the reaction period. After a total of 6800 g monomer mixture had been supplied to the reactor, monomer addition was discontinued and the reactor was purged of residual monomer. The total reaction time was 19 hours. The resulting fluoroelastomer latex was coagulated by addition of aluminum potassium sulfate solution and then washed with deionized water. The polymer crumb was dried for two days at 60° C. The product, composed of 73 wt. % TFE units, 23 wt. % P units, and 4 wt. % TFP units, was an amorphous fluoroelastomer having a glass transition temperature of 3° C., as determined by differential scanning calorimetry (heating mode, 10° C./minute, inflection point of transition). Mooney viscosity, ML-10 (121° C.), was 23.

Control A

A seed polymer latex was prepared by a semi-batch emulsion polymerization process, carried out at 60° C. in a well-stirred reaction vessel. A 33-liter, horizontally agitated reactor was charged with 20 liters of deionized, deoxygenated water, 300 g of ammonium perfluorooctanoate and 90 g of sodium phosphate dibasic heptahydrate. The reactor was heated to 60° C. and then pressurized to 2.07 MPa with a mixture of 75.0 wt. % TFE, 5.0 wt. % P, and 20.0 wt. % $VF_2$. A 250 ml aliquot of an aqueous 10 wt. % ammonium persulfate initiator solution was then added. A mixture of 70.0 wt. % TFE, 20.0 wt. % P, and 10.0 wt. % $VF_2$ was supplied to the reactor to maintain a pressure of 2.07 MPa throughout the polymerization. The initiator solution was fed continuously at 5 ml/hour through the end of the reaction period. After a total of 8000 g monomer mixture had been supplied to the reactor, monomer addition was discontinued and the reactor was purged of residual monomer. The total reaction time was 30 hours. The resulting emulsion had a solids level of 32.7% and was used as seed to make a Control Polymer (Control Polymer A).

Control Polymer A was prepared by a semi-batch emulsion polymerization process, carried out at 60° C. in a well-stirred reaction vessel. A 33-liter, horizontally agitated reactor was charged with 16 liters of deionized, deoxygenated water, 300 g of ammonium perfluorooctanoate, 90 g of sodium phosphate dibasic heptahydrate and 4000 g of the seed polymer latex prepared above. The reactor was heated to 60° C. and then pressurized to 2.07 MPa with a mixture of 75.0 wt. % TFE, 5.0 wt. % P, and 20.0 wt. % $VF_2$. A 250 ml aliquot of an aqueous 10 wt. % ammonium persulfate initiator solution was then added. A mixture of 70.0 wt. % TFE, 20.0 wt. % P, and 10.0 wt. % $VF_2$ was supplied to the reactor to maintain a pressure of 2.07 MPa throughout the polymerization. The initiator solution was fed continuously at 5 ml/hour through the end of the reaction period. After a total of 8000 g monomer mixture had been supplied to the reactor, monomer addition was discontinued and the reactor was purged of residual monomer. The total reaction time was 20 hours. The resulting emulsion was coagulated by addition of magnesium sulfate solution and then washed with deionized water. The polymer crumb was dried for two days at 60° C. The product, composed of 70 wt. % TFE units, 20 wt. % P units, and 10 wt. % $VF_2$ units, was an amorphous elastomer having a glass transition temperature of 2° C., as determined by differential scanning calorimetry (heating mode, 10° C./minute, inflection point of transition). Mooney viscosity, ML-10 (121° C.), was 46.

Example 5

Curable compositions of the invention were made by mixing some of the fluoroelastomers of the invention prepared above with a polyhydroxy curative, acid acceptor, vulcanization accelerator and other ingredients on a conventional two-roll rubber mill, using standard mixing techniques employed in the elastomer industry. Comparative curable compositions were made by the same procedure except that a fluoroelastomer of the prior art (Control Polymer A), not containing TFP cure site monomer units was used. The formulations are shown in Table I.

Curing characteristics were measured by ODR (at 177° C., 3° arc 24 minutes) according to the Test Methods. The results are also shown in Table I.

TABLE I

| Ingredient, phr[1] | Sample 1 | Sample 2 | Comp. Sample A | Sample 3 | Sample 4 | Comp. Sample B |
|---|---|---|---|---|---|---|
| Polymer 3 | 100 | 0 | 0 | 100 | 0 | 0 |
| Polymer 4 | 0 | 100 | 0 | 0 | 100 | 0 |
| Control Polymer A | 0 | 0 | 100 | 0 | 0 | 100 |
| Elastomag 170[2] | 4 | 4 | 4 | 4 | 4 | 4 |
| Calcium hydroxide | 8 | 8 | 8 | 8 | 8 | 8 |
| MT carbon black | 30 | 30 | 30 | 30 | 30 | 30 |
| TBAHAF[3] | 3.54 | 3.54 | 3.54 | | | |
| TPAHAF[4] | 0 | 0 | 0 | 3.21 | 3.21 | 3.21 |
| Curing Characteristics | | | | | | |
| $M_L$, dN·m | 7.9 | 4.4 | 10.8 | 6.2 | 4.5 | 9.5 |
| $M_H$, dN·m | 53.8 | 51.2 | 34.4 | 88.8 | 82.9 | 56.2 |
| $t_S2$, minutes | 2.6 | 4.4 | 1.8 | 4.1 | 9.1 | 4.1 |
| tc90, minutes | 13.6 | 19.3 | 7.0 | 10.6 | 20.5 | 7.5 |

[1]phr is parts by weight per 100 parts by weight rubber (i.e. elastomer)
[2]Magnesium oxide available from Morton Performance Chemicals, Inc.
[3]salt (1:1 molar ratio) of bisphenol AF curative and tetrabutylammonium hydroxide accelerator
[4]salt (1:1 molar ratio) of bisphenol AF curative and tetrapropylammonium hydroxide accelerator Example 6

A seed polymer latex of the invention was prepared by a semi-batch emulsion polymerization process, carried out at 60° C. in a well-stirred reaction vessel. A 33-liter, horizontally agitated reactor was charged with 20 liters of deionized, deoxygenated water, 150 g of ammonium perfluorooctanoate and 70 g of sodium phosphate dibasic heptahydrate. The reactor was heated to 60° C. and then pressurized to 2.07 MPa with a mixture of 90.0 wt. % TFE, 5.0 wt. % P, and 5.0 wt. % TFP. A 250 ml aliquot of an aqueous 10 wt. % ammonium persulfate initiator solution was then added. A mixture of 73.0 wt. % TFE, 24.0 wt. % P, and 3.0 wt. % TFP was supplied to the reactor to maintain a pressure of 2.07 MPa throughout the polymerization. The initiator solution was fed continuously at 5 ml/hour through the end of the reaction period. After a total of 6000 g monomer mixture had been supplied to the reactor, monomer addition was discontinued and the reactor was purged of residual monomer. The total reaction time was 46 hours. The resulting emulsion had a solids content of 19 wt. % and was used as seed to make the following polymer (Polymer 5).

A polymer of the invention (Polymer 5) was prepared by a semi-batch emulsion polymerization process, carried out at 60° C. in a well-stirred reaction vessel. A 33-liter, horizontally agitated reactor was charged with 16 liters of deionized, deoxygenated water, 450 g of ammonium perfluorooctanoate, 90 g of sodium phosphate dibasic heptahydrate and 4000 g of the seed polymer latex prepared above. The reactor was heated to 60° C. and then pressurized to 2.07 MPa with a mixture of 95.0 wt. % TFE and 5.0 wt. % P. A 250 ml aliquot of an aqueous 10 wt. % ammonium persulfate initiator solution was then added. A mixture of 73.0 wt. % TFE, 23.0 wt. % P, and 4.0 wt. % TFP was supplied to the reactor to maintain a pressure of 2.07 MPa throughout the polymerization. The initiator solution was fed continuously at 5 ml/hour through the end of the reaction period. After a total of 6000 g monomer mixture had been supplied to the reactor, monomer addition was discontinued and the reactor was purged of residual monomer. The total reaction time was 26 hours. The resulting fluoroelastomer latex was coagulated by addition of aluminum potassium sulfate solution and then washed with deionized water. The polymer crumb was dried for two days at 60° C. The product, composed of 73 wt. % TFE units, 23 wt. % P units, and 4 wt. % TFP units, was an amorphous fluoroelastomer having a glass transition temperature of 3° C., as determined by differential scanning calorimetry (heating mode, 10° C./minute, inflection point of transition). Mooney viscosity, ML-10 (121° C.), was 48.

Control B

A control polymer of the prior art (Control Polymer B) was prepared by a semi-batch emulsion polymerization, carried out at 60° C. in a well-stirred stirred reaction vessel. A 33-liter, horizontally agitated reactor was charged with 20 liters of deionized, deoxygenated water, 200 g of perfluorohexylethyl sulfonic acid and 18 g of sodium hydroxide. The reactor was heated to 60° C. and then pressurized to 2.07 MPa with a mixture of 95.0 wt. % TFE and 5.0 wt. % P. A 326 ml aliquot of an aqueous initiator solution was then added. The solution contained 10 wt. % ammonium persulfate and 3.5 wt. % sodium hydroxide. A mixture of 77.8 wt. % TFE and 22.2 wt. % P was supplied to the reactor to maintain a pressure of 2.07 MPa throughout the polymerization. The initiator solution was fed continuously at 6 ml/hour through the end of the reaction period. After a total of 8000 g monomer mixture had been supplied to the reactor, monomer addition was discontinued and the reactor was purged of residual monomer. The total reaction time was 14 hours. The resulting emulsion was coagulated by addition of aluminum potassium sulfate solution and then washed with deionized water. The polymer crumb was dried for two days at 60° C. The product, composed of 78 wt. % TFE units and 22 wt. % P units, was an amorphous fluoroelastomer having a glass transition temperature of –0.9° C., as determined by differential scanning calorimetry (heating mode, 10° C./minute, inflection point of transition). Mooney viscosity, ML-10 (121° C.), was 32.

Example 7

A curable composition of the invention (Sample 5) was made by mixing a fluoroelastomer of the invention (Polymer 5 prepared above) with a polyhydroxy curative, acid acceptor, vulcanization accelerator and other ingredients on a conventional two-roll rubber mill, using standard mixing techniques employed in the elastomer industry. A comparative curable composition (Comparative Sample C) was made by the same procedure except that a fluoroelastomer of the prior art (Control Polymer B), not containing TFP cure site monomer units was used. The formulations are shown in Table II.

Curing characteristics were measured by MDR (at 177° C., 24 minutes) according to the Test Methods. The results are also shown in Table II. Compression set of ½ inch (1.3 cm) cured (10 minutes at 177° C.) pellets was measured according to the Test Methods. Results are included in Table II.

Control Polymer B, which did not contain copolymerized units of TFP cure site monomer, did not cure under these conditions as indicated by the lack of a measurable increase in S' when Comparative Sample C was run in the MDR. On the other hand, Sample 5 which contained a polymer of the invention having copolymerized units of TFP, cured well as shown by the rise in S' and the excellent compression set value for the cured pellet.

TABLE II

| Ingredient, phr | Sample 5 | Comp. Sample C |
|---|---|---|
| Polymer 5 | 100 | 0 |
| Control Polymer B | 0 | 100 |
| TBAOH[5] | 2.3 | 2.3 |
| Maglite ® D[6] | 6 | 6 |
| Bisphenol AF | 2 | 2 |
| MT Carbon Black | 30 | 30 |
| Curing Characteristics | | |
| S'min, dN · m | 0.35 | — |
| S'max, dN · m | 10.1 | — |
| tc90, minutes | 5.06 | — |
| Compression Set | | |
| Compression Set B, 70 hours @ 200° C., % | 24 | — |

[5]8.9 ml of a 1.0M solution of tetrabutylammonium hydroxide in methanol on 3.0 g of an inert support of Micro-Cel E synthetic calcium silicate powder, available from World Minerals, Inc.
[6]Magnesium oxide available from C.P. Hall Example 8

Curable compositions of the invention (Samples 6 and 7) were made by mixing a fluoroelastomer of the invention (prepared substantially as Polymer 1 above except containing 76 wt. % copolymerized units of TFE, 20 wt. % units of P and 4 wt. % units of TFP) with a derivative of a polyhydroxy curative, acid acceptor, vulcanization accelerator and other ingredients on a conventional two-roll rubber mill, using standard mixing techniques employed in the elastomer industry. The formulations are shown in Table III.

Curing characteristics were measured by MDR (at 177° C., 24 minutes) according to the Test Methods and results are shown in Table III.

TABLE III

| Ingredient, phr | Sample 6 | Sample 7 |
|---|---|---|
| Polymer | 100 | 100 |
| TBAHS[7] | 2.3 | 2.3 |
| Maglite D | 3.0 | 3.0 |
| Hydroquinone Diacetate | 1.15 | 0 |
| Resorcinol Monobenzoate | 0 | 2.14 |
| MT Carbon Black | 30 | 30 |
| Calcium Hydroxide | 6.0 | 6.0 |
| Curing Characteristics | | |
| Tmin, dN · m | 0.62 | 0.59 |
| Tmax, dN · m | 12.7 | 20.43 |
| tc90, minutes | 11.45 | 8.35 |

[7]n-tetrabutylammonium hydrogensulfate

Example 9

Curable compositions of the invention (Samples 8–12) were made by mixing a fluoroelastomer of the invention (prepared substantially as Polymer 1 above except containing 73 wt. % copolymerized units of TFE, 23 wt. % units of P and 4 wt. % units of TFP) with various quaternary ammonium salts of bisphenol AF (1:1 molar ratio), acid acceptor, and other ingredients on a conventional two-roll rubber mill, using standard mixing techniques employed in the elastomer industry. The formulations are shown in Table IV.

Curing characteristics were measured by ODR (at 177° C., 3° arc, 12 minutes) according to the Test Methods and results are shown in Table IV.

TABLE IV

| Ingredient, phr | Sample 8 | Sample 9 | Sample 10 | Sample 11 | Sample 12 |
|---|---|---|---|---|---|
| Polymer | 100 | 100 | 100 | 100 | 100 |
| TMAHAF[8] | 2.54 | 0 | 0 | 0 | 0 |
| TPrAHAF[9] | 0 | 3.21 | 0 | 0 | 0 |
| MTBAHAF[10] | 0 | 0 | 3.15 | 0 | 0 |
| TBAHAF[11] | 0 | 0 | 0 | 3.45 | 0 |
| TPeAHAF[12] | 0 | 0 | 0 | 0 | 3.78 |
| Elastomag 170 | 3 | 3 | 3 | 3 | 3 |
| Calcium hydroxide | 6 | 6 | 6 | 6 | 6 |
| MT carbon black | 30 | 30 | 30 | 30 | 30 |
| Curing characteristics | | | | | |
| $M_L$, dN · m | 7.5 | 4.4 | 3.6 | 4.4 | 3.8 |
| $M_H$, dN · m | 9.8 | 81.9 | 70.6 | 51.2 | 22.8 |
| $t_S2$, minutes | — | 4.0 | 3.8 | 4.4 | — |
| tc90, minutes | — | 13.7 | 7.6 | 19.3 | — |

[8]tetramethylammonium/BPAF salt (1:1 molar ratio)
[9]tetrapropylammonium/BPAF salt (1:1 molar ratio)
[10]methyltributylammonium/BPAF salt (1:1 molar ratio)
[11]tetrabutylammonium/BPAF salt (1:1 molar ratio)
[12]tetrapentylammonium/BPAF salt (1:1 molar ratio)

What is claimed is:

1. A curable fluoroelastomer composition comprising
    A) a specialty fluoroelastomer comprising copolymerized units of 45 to 80 weight percent tetrafluoroethylene; 10 to 40 weight percent propylene; and 0.1 to 15 weight percent of a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene;
    B) 0.1 to 20 parts by weight per 100 parts fluoroelastomer of a polyhydroxy curing agent;
    C) 1 to 30 parts by weight per 100 parts fluoroelastomer of an acid acceptor; and
    D) 0.1 to 20 parts by weight per 100 parts fluoroelastomer of a vulcanization accelerator.

2. A curable fluoroelastomer composition of claim 1 wherein said specialty fluoroelastomer comprises copolymerized units of tetrafluoroethylene present in an amount between 65 and 78 weight percent; copolymerized units of propylene in an amount between 15 and 25 weight percent; and copolymerized units of cure site monomer in an amount between 2 and 10 weight percent.

3. A curable fluoroelastomer composition of claim 2 wherein said cure site monomer is 3,3,3-trifluoropropene-1.

4. A curable fluoroelastomer composition of claim 1 wherein said specialty fluoroelastomer further comprises copolymerized units of vinylidene fluoride present in an amount between 2 and 20 weight percent.

5. A curable fluoroelastomer composition of claim 1 further comprising E) 0.2 to 7 parts by weight per 100 parts fluoroelastomer of an organic peroxide and F) 0.1 to 10 parts by weight per 100 parts fluoroelastomer of a multifunctional coagent.

6. A curable fluoroelastomer composition of claim 1 wherein said polyhydroxy curing agent B is a curing agent selected from the group consisting of i) dihydroxy-, trihydroxy-, and tetrahydroxy-benzenes, -naphthalenes, and -anthracenes;

ii) bisphenols of the formula

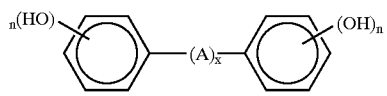

where A is a stable divalent radical; x is 0 or 1; and n is 1 or 2;
  iii) dialkali salts of said bisphenols, iv) quaternary ammonium and phosphonium salts of said bisphenols, v) tertiary sulfonium salts of said bisphenols, and vi) esters of phenols.

7. A curable fluoroelastomer composition of claim 1 wherein said vulcanization accelerator D is chosen from the group consisting of quaternary ammonium salts, tertiary sulfonium salts and quaternary phosphonium salts.

8. A curable fluoroelastomer composition of claim 7 wherein said cure accelerator D is selected from the group consisting of i) quaternary ammonium salts of said polyhydroxy crosslinking agent (B), ii) quaternary phosphonium salts of said polyhydroxy crosslinking agent (B) and iii) tertiary sulfonium salts of said polyhydroxy crosslinking agent.

9. A curable fluoroelastomer composition comprising
  A) a specialty fluoroelastomer comprising copolymerized units of 45 to 80 weight percent tetrafluoroethylene; 10 to 40 weight percent propylene; and 0.1 to 15 weight percent of a cure site monomer selected from the group consisting of i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene;
  B) a compound selected from the group consisting of i) quaternary ammonium salts of a bisphenol, ii) quaternary phosphonium salts of a bisphenol and iii) tertiary sulfonium salts of a bisphenol; and
  C) an acid acceptor.

10. A curable fluoroelastomer composition of claim 9 wherein said specialty fluoroelastomer comprises copolymerized units of tetrafluoroethylene present in an amount between 65 and 78 weight percent; copolymerized units of propylene in an amount between 15 and 25 weight percent; and copolymerized units of cure site monomer in an amount between 2 and 10 weight percent.

11. A curable fluoroelastomer composition of claim 10 wherein said cure site monomer is 3,3,3-trifluoropropene-1.

12. A curable fluoroelastomer composition of claim 9 wherein said specialty fluoroelastomer further comprises copolymerized units of vinylidene fluoride present in an amount between 2 and 20 weight percent.

13. A curable fluoroelastomer composition of claim 9 further comprising E) 0.2 to 7 parts by weight per 100 parts fluoroelastomer of an organic peroxide and F) 0.1 to 10 parts by weight per 100 parts fluoroelastomer of a multifunctional coagent.

14. A curable fluoroelastomer composition of claim 9 wherein said quaternary ammonium salt of a bisphenol is selected from the group consisting of a) a tetrapropylammonium/bisphenol AF salt, b) a methyltributylammonium/bisphenol AF salt, and c) a tetrabutylammonium/bisphenol AF salt.

15. A curable fluoroelastomer composition of claim 9 wherein said quaternary ammonium salt of a bisphenol is a 1:1 molar ratio salt of a quaternary ammonium compound and bisphenol AF.

* * * * *